US008296125B2

(12) United States Patent
Shetty et al.

(10) Patent No.: US 8,296,125 B2
(45) Date of Patent: Oct. 23, 2012

(54) TRANSLATING SOURCE LOCALE INPUT STRING TO TARGET LOCALE OUTPUT STRING

(75) Inventors: Rohit Shetty, Bangalore (IN); Arun Ramakrishnan, Chennai (IN); Saurabh Dravid, Bangalore (IN); Krishna Shastry, Dakshina Kannada Vittal (IN)

(73) Assignee: International Business Machines Corporation, Armonk, NY (US)

( * ) Notice: Subject to any disclaimer, the term of this patent is extended or adjusted under 35 U.S.C. 154(b) by 1041 days.

(21) Appl. No.: 12/253,300

(22) Filed: Oct. 17, 2008

(65) Prior Publication Data

US 2010/0100369 A1   Apr. 22, 2010

(51) Int. Cl.
*G06F 17/28* (2006.01)
(52) U.S. Cl. ............ 704/4; 704/2; 704/3; 704/5; 704/6; 704/7; 704/8; 704/9; 704/273; 704/277; 706/50; 706/55; 707/737; 715/259
(58) Field of Classification Search .................. 704/2, 6, 704/9, 5, 3, 4, 7, 8, 273, 277; 706/50, 55; 707/737; 715/259
See application file for complete search history.

(56) References Cited

U.S. PATENT DOCUMENTS

| | | | | |
|---|---|---|---|---|
| 5,001,633 A | * | 3/1991 | Fukumochi et al. | 704/6 |
| 5,495,413 A | * | 2/1996 | Kutsumi et al. | 704/4 |
| 5,541,838 A | * | 7/1996 | Koyama et al. | 704/4 |
| 5,625,553 A | * | 4/1997 | Kutsumi et al. | 704/2 |
| 5,696,980 A | * | 12/1997 | Brew | 704/273 |
| 5,748,850 A | * | 5/1998 | Sakurai | 706/50 |
| 6,374,210 B1 | * | 4/2002 | Chu | 704/9 |
| 6,760,695 B1 | * | 7/2004 | Kuno et al. | 704/9 |
| 6,778,970 B2 | * | 8/2004 | Au | 706/55 |
| 6,981,031 B2 | | 12/2005 | French et al. | |
| 7,152,222 B2 | | 12/2006 | Kumhyr et al. | |
| 7,620,538 B2 | * | 11/2009 | Marcu et al. | 704/2 |
| 2001/0056352 A1 | * | 12/2001 | Xun | 704/277 |
| 2002/0177992 A1 | * | 11/2002 | Andrews et al. | 704/5 |
| 2004/0205671 A1 | * | 10/2004 | Sukehiro et al. | 715/532 |
| 2005/0137853 A1 | * | 6/2005 | Appleby | 704/9 |
| 2006/0167675 A1 | * | 7/2006 | Miyahira et al. | 704/2 |
| 2008/0097745 A1 | * | 4/2008 | Bagnato et al. | 704/8 |
| 2008/0270111 A1 | * | 10/2008 | Hanumanthappa | 704/3 |

(Continued)

OTHER PUBLICATIONS

C. Charras et al., "Exact string matching algorithms," http://wvvw-igm.univ-mly.fr/~lecrog/string/index.html, dated Jan. 14, 1997.

(Continued)

*Primary Examiner* — Michael Colucci
(74) *Attorney, Agent, or Firm* — Libby Z. Toub

(57) ABSTRACT

A dictionary mapping source locale strings to target locale strings is constructed. A tree is constructed from the dictionary. The tree has nodes including a start node, end nodes, and string nodes. The nodes form node chains of the tree that correspond to the source locale strings. Each node chain links a collection of the nodes from the start node to a string node. Each node other than the start node has a parent node and corresponds to a character of the source locale strings. Each node other than the end nodes has one or more child nodes. Each string node ends a node chain, and corresponds to a mapping within the dictionary of a source locale string to a target locale string. An input string having the source locale is processed against the tree to generate an output string having the target locale.

19 Claims, 11 Drawing Sheets

U.S. PATENT DOCUMENTS

2009/0030671 A1* 1/2009 Kwon et al. .................. 704/2
2009/0326917 A1* 12/2009 Hegenberger ................ 704/7
2010/0049766 A1* 2/2010 Sweeney et al. ............ 707/737

OTHER PUBLICATIONS

Wikipedia entry for Trie, http://en.wikipedia.org, last modified Apr. 27, 2008.

Wikipedia entry for Internationalization and localization, http://en.wikipedia.org, last modified May 20, 2008.

Wikipedia entry for Natural language support objects, http://en.wikipedia.org, last modified Sep. 24, 2007.

G. Badr et al., "On optimizing syntactic pattern recognition using tries and AI-based heuristic-search strategies," IEEE Trans. on Systems, Man, & Cybernetics, Jun. 2006.

M. Crochemore et al., "A trie-based approach for compacting automata," CPM 2004, LNCS 3109, pp. 145-158, year 2004.

* cited by examiner

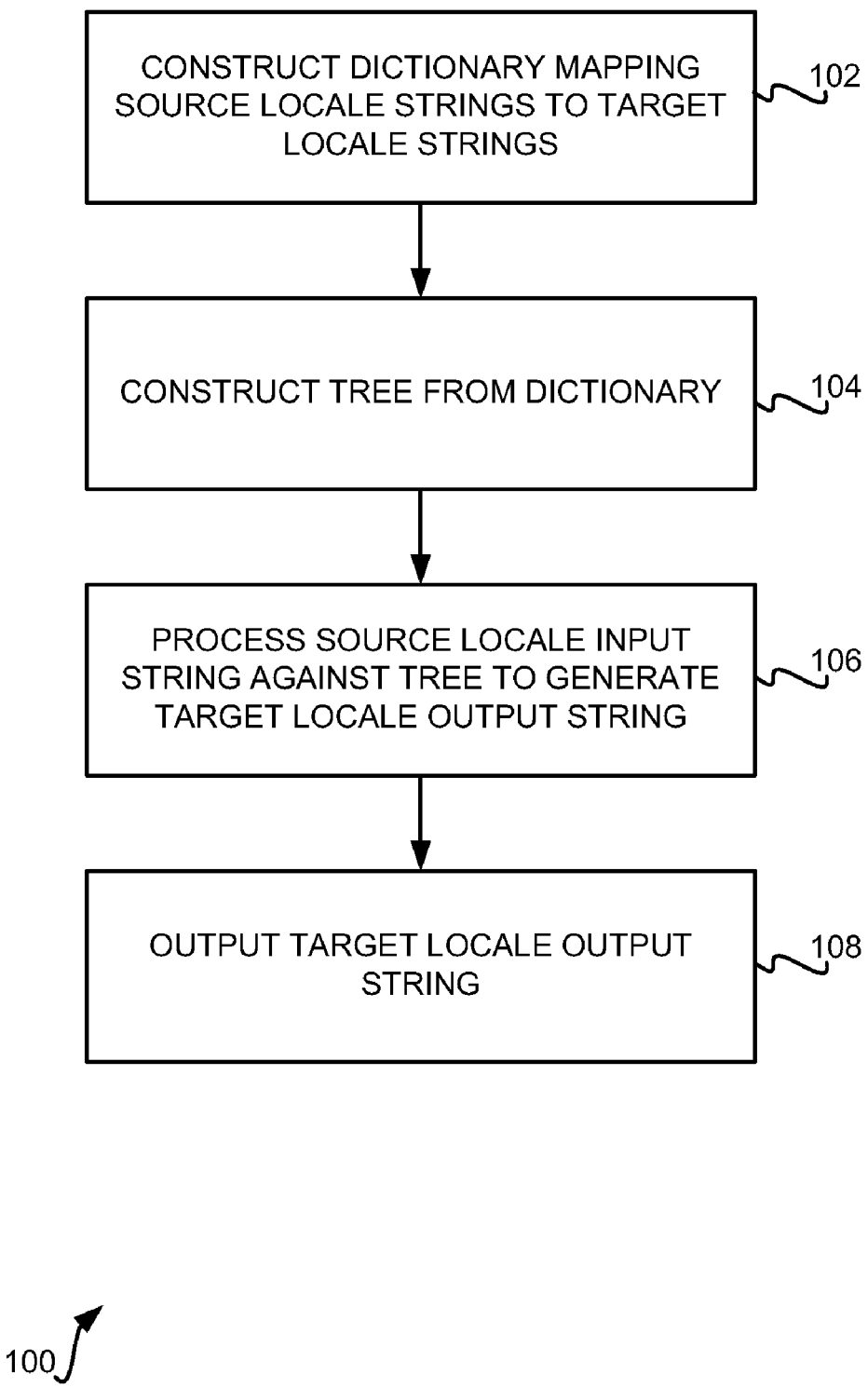

FIG 2

202 — sample_en.properties
MSG1=For
MSG2=Fort
MSG3=Forget
MSG4=File {0} deleted

204 — sample_it.properties
MSG1=Per
MSG2=Forte
MSG3=Dimenticar
MSG4=Lima {0} cancellata

FIG 3

| Source locale (302) | Target locale (304) |
|---|---|
| For | Per |
| Fort | Forte |
| Forget | Dimenticar |
| File * deleted | Lima {0} canellata |

306 } (rows)

502 —
!ENTRY org.eclipse.core.runtime 2 0 2007-07-31 11:59:47.147
!MESSAGE File File.log deleted 504 —
!ENTRY org.eclipse.core.runtime 2 0 2007-07-31 11:59:47.147
!MESSAGE Lima File.log cancellata

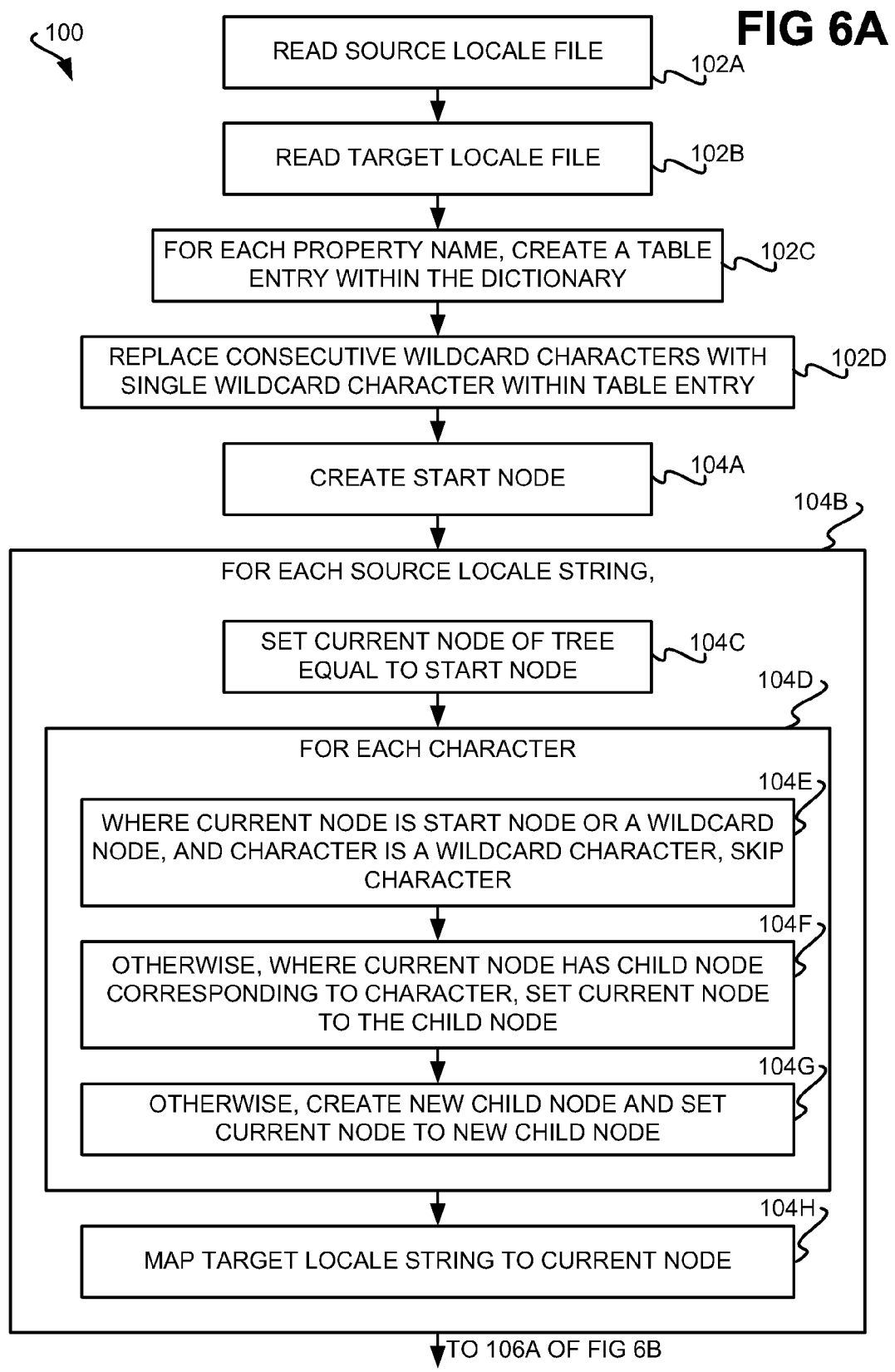

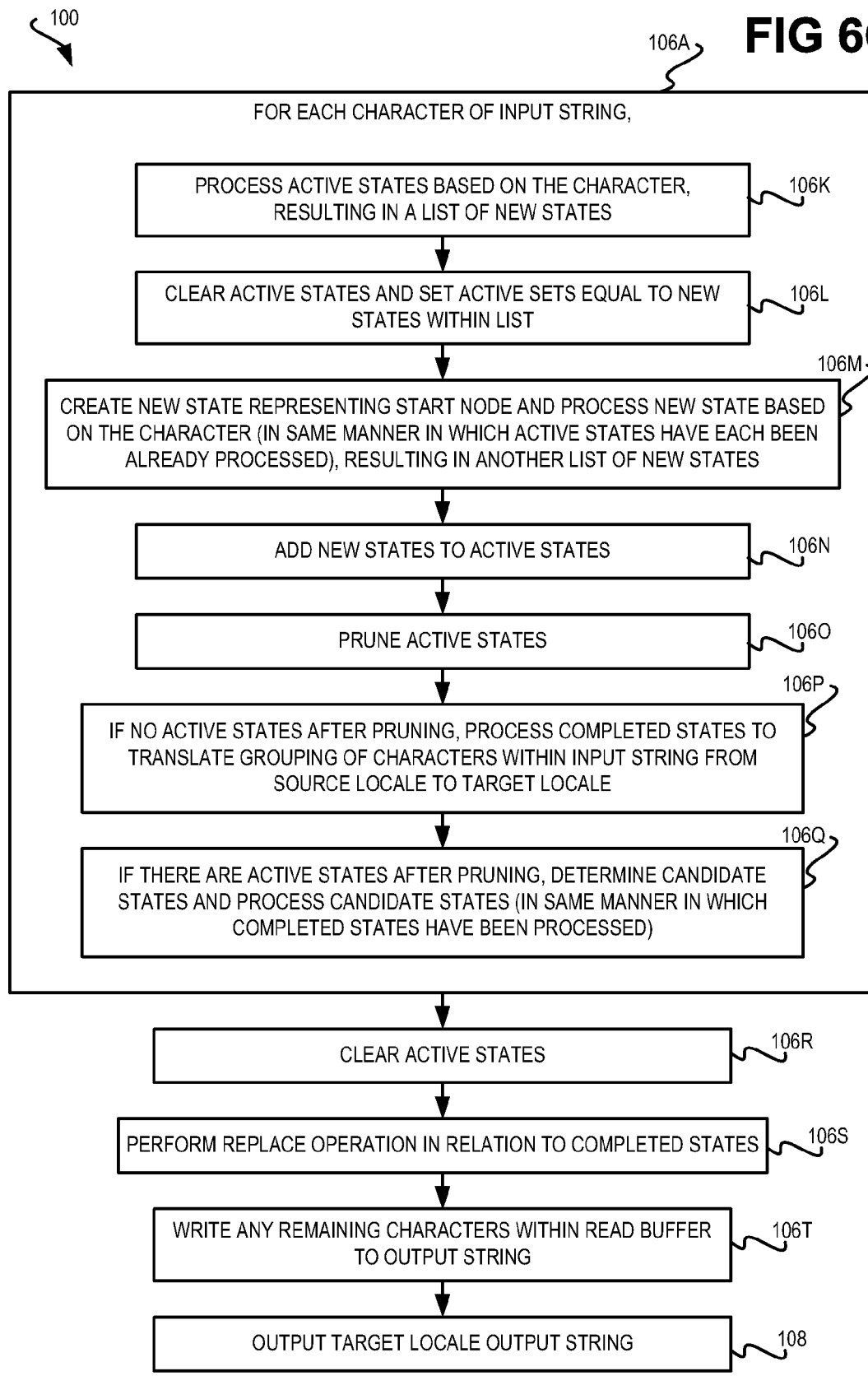

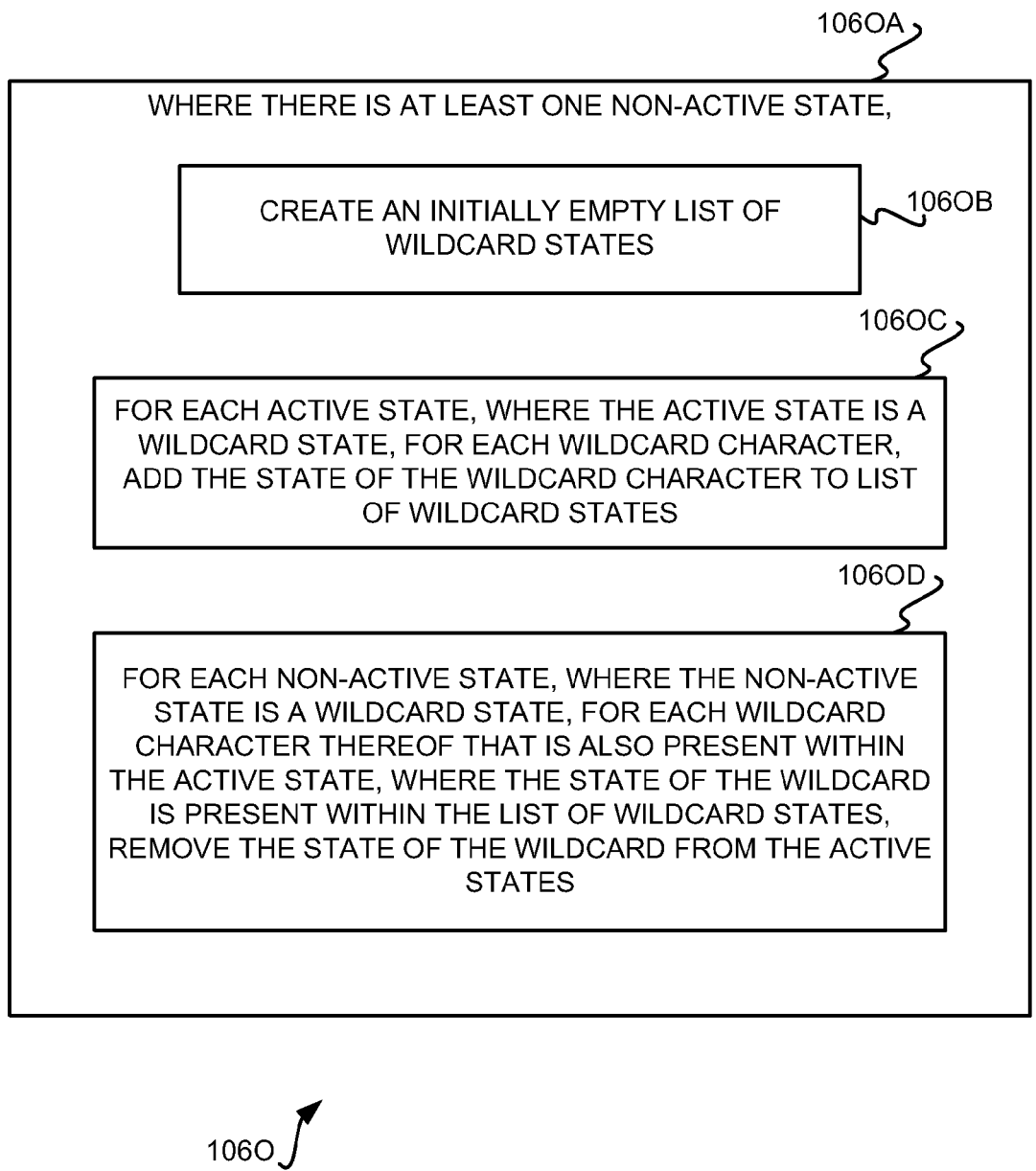

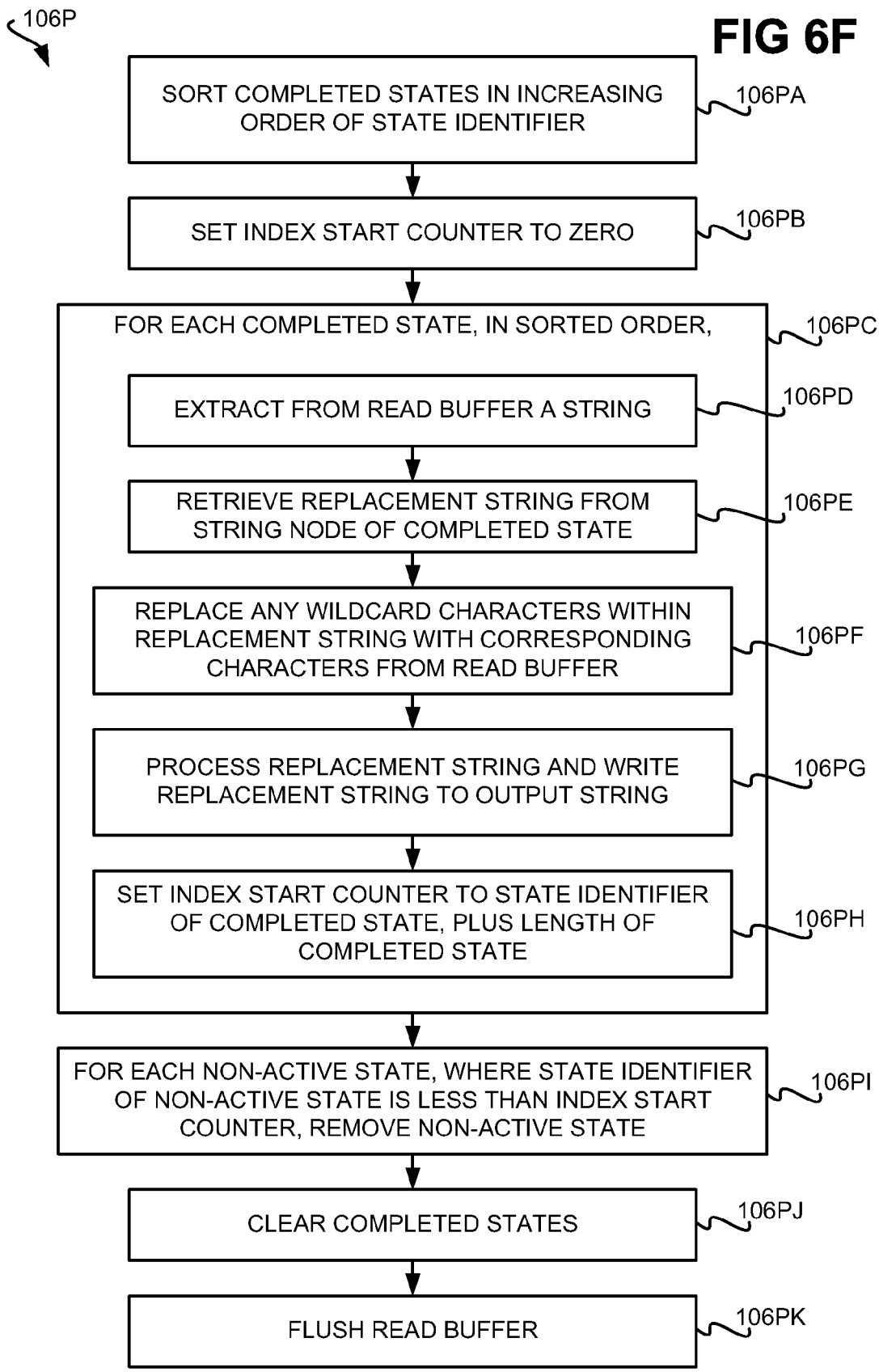

TRANSLATING SOURCE LOCALE INPUT STRING TO TARGET LOCALE OUTPUT STRING

FIELD OF THE INVENTION

The present invention relates generally to translating an input string having a source locale to an output string having a target locale, where, for instance, the input string is part of an error log file for an application computer program having the source locale. The present invention relates more particularly to using a tree to translate such an input string to such an output string.

BACKGROUND OF THE INVENTION

Many types of commercial software are internationalized so that they can be easily used by users of different countries who may speak different languages or different dialects of different languages. Such software goes through a localization process, in which the user interface and other aspects of the software are customized to the user's local environment, or source locale. For instance, the user interface may be display in the local language of the user, and error logs may also be generated in this local language.

Localization, however, becomes problematic when the software generates an error log that is particular to a source locale, such as a language, that is not understood by support personnel responsible for fixing the errors that resulting in the error log. The support personnel may attempt to reproduce the errors in a version of the software that is particular to the support personnel's source locale. However, many types of errors result from the particular environment of the user, which means that the support personnel may not be able to reproduce the problem at a remote site.

The support personnel may also request that the user switch the source locale in which the software is running to that of the support personnel, and ask the user to attempt to reproduce the problem. However, this places an onerous burden on the user, since he or she has to modify the source locale of the software, and may have to modify the source locale of the entire computing system within which the software is running. Furthermore, the user him or herself may be unable to reproduce the problem.

As such, localization of software to the particular source locale of a user has become an issue for support personnel unfamiliar with the source locale in attempting to diagnose and fix errors that occur within the software. Where the error log is in a language that the support personnel do not understand, it may be difficult at best for the support personnel to diagnose and fix the errors that resulted in generation of the error log. For these and other reasons, there is a need for the present invention.

SUMMARY OF THE INVENTION

The present invention relates to translating an input string having a source locale to an output string having a target locale. A method of one embodiment of the invention constructs a dictionary mapping source locale strings of the source locale to target locale strings of the target locale. The method constructs a tree from the dictionary. The tree has nodes including a start node, one or more end nodes, and one or more string nodes. The nodes form one or more node chains of the tree, where the node chains correspond to the source locale strings.

Each node chain links a collection of the nodes from the start node to one of the string nodes, and each node within the collection of the nodes is linked to another node within the collection of nodes. Each node other than the start node has a parent node, and corresponds to a character of the source locale strings. Each node other than the end nodes has one or more child nodes. Each string node ends one of the node chains of the tree, and corresponds to a mapping within the dictionary of one of the source locale strings to one of the target locale strings.

The method processes the input string against the tree to generate the output string. The input string has a number of characters that are processed on a character-by-character basis against the tree to match the characters to one of the node chains within the tree to translate the characters from the source locale to the target locale. The method then outputs the output string.

A system of an embodiment of the invention is for translating an input string having a source locale to an output string having a target locale. The system includes hardware, as well as a dictionary-construction component, a tree-construction component, and a translation component that are all implemented at least by the hardware. The dictionary-construction component constructs a dictionary as has been described, while the tree-construction component constructs a tree as has been described. The translation component generates the output string as has been described.

A computer-readable medium of an embodiment of the invention has one or more computer programs stored thereon. The computer-readable medium may be a recordable data storage medium, or another type of tangible computer-readable medium. The computer programs are executable by one or more processors of one or more computing devices. Execution of the computer program results in performance of a method to translate an input string having a source locale to an output string having a target locale, as has been described.

Embodiments of the invention provide for advantages over the prior art. The input string may be part of an error log file generated by software having the source locale of an end user. By comparison, the output string may have the target locale of support personnel responsible for diagnosing and fixing the errors that resulted in the error log file. As such, the support personnel are able to understand the error log file, because it is translated from the language of the end user, for instance, to the language of the support personnel.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

FIG. 1 is a flowchart of a method for translating an input string having a source locale to an output string having a target locale, according to a general embodiment of the invention.

FIG. 2 is a diagram of representative locale bundles that can be employed to construct a dictionary, according to an embodiment of the invention.

FIG. 3 is a diagram of a representative dictionary mapping source locale strings to target locale strings and that is constructed based on the locale bundles of FIG. 2, according to an embodiment of the invention.

FIG. 5 is a diagram of a representative source locale input string that is translated into a corresponding target locale output string using the tree of FIG. 4, according to an embodiment of the invention.

FIGS. 6A, 6B, 6C, 6D, 6E, 6F, and 6G are flowcharts of a method for translating an input string having a source locale to an output string having a target locale, according to a more detailed embodiment of the invention.

DETAILED DESCRIPTION OF THE DRAWINGS

Figure 4:
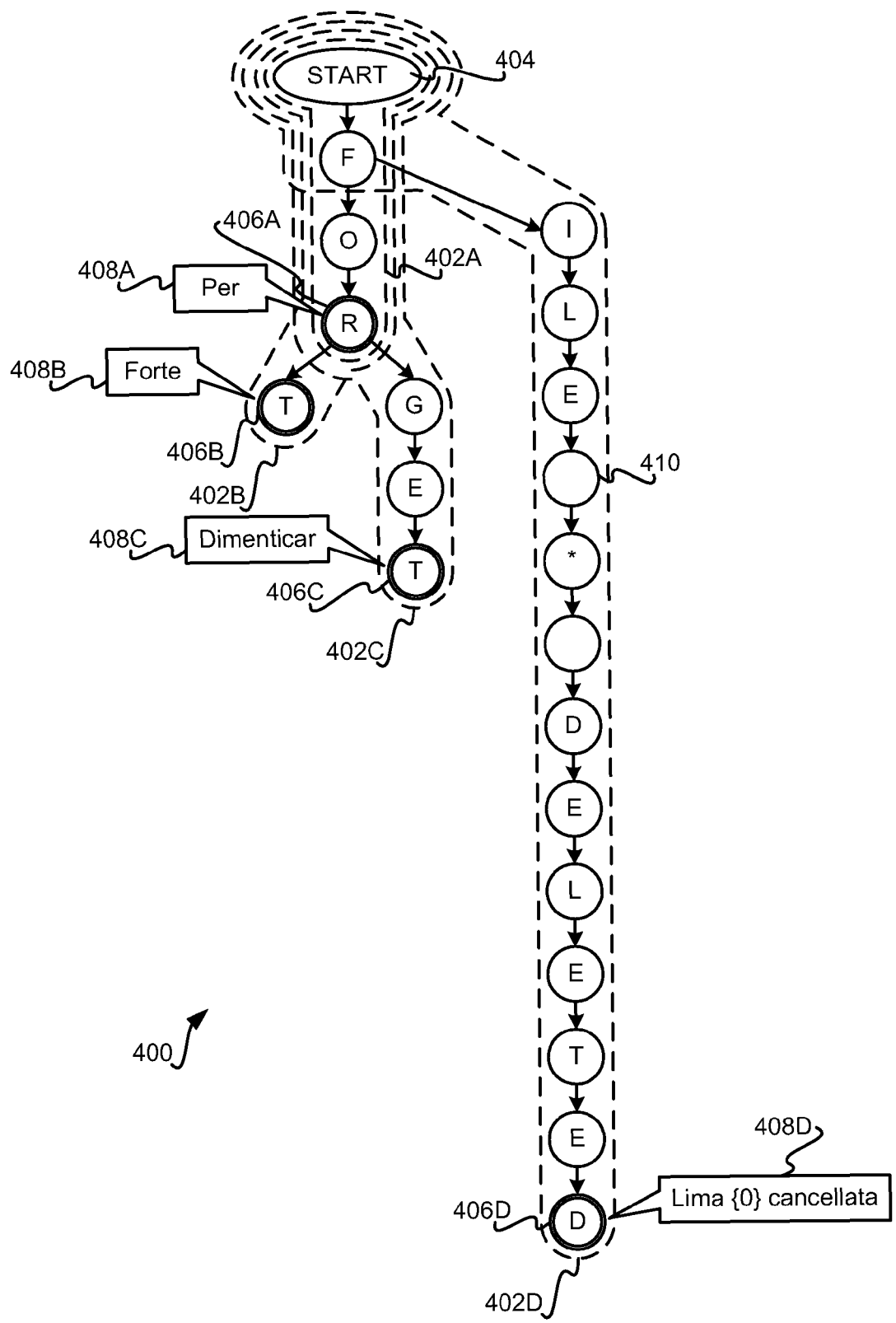
FIG. 4 is a diagram of a representative tree for translating source locale strings to target locale strings and that is constructed from the dictionary of FIG. 3, according to an embodiment of the invention.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

OVERVIEW AND EXAMPLE

FIG. 1 shows a method 100 for translating an input string having a source locale to an output string having a target locale, according to an embodiment of the invention. The input string may be part of a textual error log file generated by software that has been customized to the source locale. For instance, the software may be an application computer program having the source locale in question. The output string may be part of the textual error log file as translated to the target locale. A locale as used herein represents an operating environment within which software runs and that is particular to a specific geographical and/or linguistic area. As such, a locale includes a particular human language in which the software runs, such as English, Italian, Chinese, Spanish, and other human languages.

A dictionary is constructed that maps source locale strings to target locale strings (102). The dictionary may be constructed from resource bundles of the software that generated the textual error log file of which the input string is a part. For instance, when internationalizing software, the software may have a number of different resource bundles, corresponding to the different locales in which the software may operate. Based on the resource bundles for the source locale and the target locale, a mapping of strings within the source locale to corresponding strings within the target locale is generated.

FIG. 2 shows representative portions of two locale bundles 202 and 204, according to an embodiment of the invention. The source locale bundle 202 is in English, while the target locale bundle 204 is in Italian. There are four message strings in each of the bundles 202 and 204, which are denoted by the lines "MSGx=", where "x" is a number from 1 to 4. Thus, the third message string "Forget" in the source locale bundle 202 corresponds to the third message string "Dimenticar" in the target locale bundle 204.

From the text within the locale bundles 202 and 204, a mapping of a string from the source locale bundle 202 to its corresponding string in the target locale bundle 204 is created for each string. During construction of the dictionary, runtime values that are substituted are replaced with a token to denote a wildcard. For instance, in FIG. 2, in "File {0} deleted" the "{0}" token represents a runtime substitution that is replaced with "*", which is the wildcard token or character. Wildcard substitution is performed because at the time of construction of the dictionary the exact length of runtime data that replaces these tokens is not known, such that the tokens are treated like wildcards.

FIG. 3 shows a representative portion of a dictionary 300 that maps the strings from the source locale bundle 202 to the target locale bundle 204, according to an embodiment of the invention. Within the dictionary 300 are a number of entries, or rows, 306, each of which has values in a source locale column 302 and a target locale column 304. The entries 306 each map a string of the source locale bundle 202, as identified in the column 302, to a string of the target locale bundle 204, as identified in the column 304. In FIG. 3, then, the first entry corresponds to mapping the source locale string "For" to the target locale string "Per", the second entry maps the source locale string "Fort" to the target locale string "Forte", and so on.

Referring back to FIG. 1, after the dictionary has been constructed, a tree is constructed from the dictionary (104). The tree is used to actually translate an input string in the source locale to an output string in the target locale. The mappings within the dictionary are used to construct the tree.

FIG. 4 shows a representative portion of a tree 400 that is constructed from the dictionary 300, according to an embodiment of the invention. The tree 400 has a number of nodes, which are represented by circles and ovals in FIG. 4. Of the nodes of the tree 400, there is a start node 404 and a number of nodes 406A, 406B, 406C, and 406D, which are referred to herein as string nodes 406. Of the string nodes 406, the nodes 406B, 406C, and 406D are also end nodes. The nodes of the tree 400 form or link a number of constructs 402A, 402B, 402C, and 402D referred to as node chains 402.

The node chains 402 correspond to the source locale strings within the dictionary 300. Thus, the node chain 402A corresponds to the source locale string "For"; the node chain 402B corresponds to the source locale string "Fort"; the node chain 402C corresponds to the source locale string "Forget"; and the node chain 402D corresponds to the source locale string "File * deleted". The node chains 402 can share nodes amongst themselves, such that the node chains 402 can overlap in their constituent nodes.

For instance, all the node chains 402 share the start node 404 and the immediately following node "F". Furthermore, the node chains 402A, 402B, and 402C share the nodes "O" and "R" in addition to the node "F" and the start node 404. Each node chain thus links a collection of the nodes from the start node to one of the string nodes 406. Each node within a given collection is linked to another node within the collection. For instance, in the node chain 402A, the start node 404 is linked to the node "F", which is linked to the node "O", which is linked to the node "R".

Furthermore, each node within the tree 400, other than the start node 404, has a parent node. For instance, the node "F" has at its parent node the start node 404, and the node "O" to which the node "F" is linked has as its parent node the node "F". In addition, each node other than the start node corresponds to a character of one or more of the source locale strings. For example, the node "F" corresponds to the "F" character in each of the source locale strings "For", "Fort", "Forget", and "File * deleted". The node "T" within the node chain 402B corresponds to the "t" character in the source locale string "Fort" (but not to the "t" character in the source locale string "Forget").

Each node other than the end nodes 406B, 406C, and 406D has one or more child nodes. For instance, the start node 404 has as its child node the node "F", while the node "F" has as its child nodes the nodes "O" and "I". Furthermore, each of the end nodes 406B, 406C, and 406D is also a string node, but not all the string nodes 406 are end nodes. In particular, the string node 406A is not an end node, since it has two child nodes "T" and "G". Thus, it can be said that at least one of the string nodes 406 is an end node (viz., the nodes 406B, 406C, and 406D), and at least one of the string nodes 406 is not an end node (viz., the node 406A).

Each of the string nodes 406 ends one of the node chains 402 of the tree 400. Each of the string nodes 406 thus corresponds to a mapping within the dictionary 300 of one of the source locale strings to a corresponding one of the target locale strings. Target locale strings 408A, 408B, 408C, and 408D, collectively referred to as the target locale strings 408, are particularly associated with and encapsulated within the string nodes 406.

For example, the string node 406A ends the node chain 402A, and corresponds to the mapping of the source locale string "For" represented by the node chain 402A to the target locale string "Per", which is denoted as the target locale string 408A associated with and encapsulated within the string node 406A. Similarly, the string node 406B ends the node chain 402B, and corresponds to the mapping of the source locale string "Fort" represented by the node chain 402B to the target locale string "Forte". The target locale string "Forte" is denoted as the target locale string 408B that is associated with and encapsulated within the string node 406B.

Within the node chain 402D of the tree 400, there is a node 410 representing the wildcard character "*" within the source locale string "File * deleted" of the dictionary 300. The node 410 is referred to as a wildcard node. There can be more than one wildcard node within a tree, and each wildcard node represents a wildcard character within a corresponding source locale string of a dictionary.

Referring back to FIG. 1, a source locale input string is processed against the tree that has been constructed to generate a corresponding target locale output string (106). The input string has a number of characters. The characters are processed on a character-by-character basis against the tree, to match each grouping or a number of groupings of characters within the input string to one of the node chains within the tree. In this way, each such grouping of characters is translated to the target locale. The result of translating each such grouping of characters within the input string is a translation of the input string (of the source locale) to an output string (of the target locale).

FIG. 5 shows a source locale input string 502 and its corresponding translated target locale output string 504, according to an embodiment of the invention. The input string 502 is in English, whereas the output string 504 is in Italian. The locale input string 502 is processed on a character-by-character basis against the tree 400 to generate the output string 504, as is now described in more detail.

First, it is noted that a state refers to a node in the tree 400 that has been reached by traversal from the start node 404. A wildcard start is a state that is currently at a wildcard node within the tree 400, such as the wildcard node 410. The children of a state refers to the children of the node corresponding to the node of the state in question.

When a character of the input string 502 is read, it is determined whether any children of the start node 404 correspond to this character. For instance, when reading the characters of the input string 502, since the only child node of the start node 404 is the node "F", the characters of the input string 502 are read until the first "F" in the input string 502 is reached. Until that point, all the characters read from the input string 502 are not matched to the tree 400, and are output to the output string 504 without translation, as unmatched text. Thus, when the grouping of characters "File File.log deleted" is read, the first letter "F" matches the child node of the start node 404, and an active state is created for this match.

The reading of characters from the input string 502 continues in this way, advancing states until the wildcard node 410 is reached. The wildcard consumes the subsequent characters from the input string 502 until a space character is reached, corresponding to the space character node within the node chain 402D of the tree 400. Furthermore, after reading the first letter of the filename "File.log", this letter is matched to the "F" child node of the start node 404, such that a new active state is created while the wildcard state continues to consume characters of the input string 502. When the end of the word "File" in "File.log" is reached, the next expected node in the tree is the first space character node in the node chain 402D of the tree 400. However, the input string 502 contains the period character ".", such that this state is discard.

Once the end of the filename "File.log" is reached, the space character is a valid child node to the wildcard node, and becomes an active state. The wildcard state, however, will remain active so as to allow backtracking if the other active states are discarded at any point. In this example, the entire text "File File.log deleted" is matched and the string node 406D is reached within the tree. At this point, there is a completed state corresponding to node chain 402D ending in the string node 406D.

Since the end of the input string 502 has been reached, all non-completed states are discard, and the text that matched the completed state (i.e., corresponding to the node chain 402D) is replaced with the replacement text (i.e., the target locale string 408D corresponding to the node chain 402D). While performing this replacement, the characters that matched the wildcard node 410 replace corresponding wildcard tokens within the replacement string. For instance, the wildcard text in this example is "File.log" such that this text replaces the wildcard tokens "{0}" in the target locale string 408D corresponding to the node chain 402D.

In this example of translating the input string 502 to the output string 504, it is noted that each node of the node chain 402D, other than the start node 404 and the wildcard node 410, corresponds to a single character with the grouping of characters "File file.log deleted" of the input string 502. By comparison, the start node 404 does not correspond to any character within this grouping of characters. Furthermore, the wildcard node 410 corresponds to more than one character within this grouping of characters, particularly the characters "file.log".

Referring back to FIG. 1, the method 100 concludes by outputting the target locale output string that has been generated by processing the source locale input string against the tree (108). The output string may be output in a number of different ways. The output string may be stored on a computer-readable medium, for instance, like a recordable data storage medium. The output string may be displayed on a display device for viewing by a user. The output string may be printed using a printing device, also for viewing by the user.

The output string may further be communicated over a network, such as the Internet, for instance.

Detailed Implementation

FIGS. 6A, 6B, 6C, 6D, 6E, 6F, and 6G show the method 100 in more detail, according to a specific embodiment of the invention. Lettered parts of the method 100 in these figures correspond to implementation of like-numbered parts in FIG. 1. For instance, parts 102A, 102B, 102C, and 102D in FIG. 6A implement part 102 of the method 100 as described in relation to FIG. 1. As another example, parts 104A, 104B, 104C, 104D, 104E, 104F, 104G, and 104H implement part 104 of the method 100 as described in relation to FIG. 1.

Referring first to FIG. 6A, to construct the dictionary, a source locale file is read (102A) and a target locale file is read (102B). The source locale file has source locale strings identified by property names, and the target locale file has target local strings identified by the same property names. For each property name, a table entry is created within a table corresponding to the dictionary under construction (102C). The table entry for a property name maps the source locale string identified by the property name to the target locale string identified by the same property name. Furthermore, where a given source locale string has a number of consecutive wildcard characters or tokens, they are replaced with a single wildcard character, such as "*", within the source locale string as stored in the table entry in question (102D).

To construct the tree from the dictionary, a start node of the tree is initially created (104A). Thereafter, the following is performed for each source locale string (104B). First, a current node of the tree is set equal to the start node of the tree (104C). The following is then performed for each character of the source locale string (104D), in order from the first character of the string to the last character of the string, where the source locale string has a number of characters. If the current node is a start node or a wildcard node, and the current character is a wildcard character, then the current character is skipped (104E).

Otherwise, if the current node has a child node corresponding to the current character, then the current node is set to this child node (104F). By comparison, if the current node does not have a child node corresponding to the current character, then a new child node is created and the current node is set to this newly created child node (104G). It is noted in the case where the current character is a wildcard character, the newly created child node is a wildcard node.

Once all the characters of the current source locale string have been processed in this way, the target locale string corresponding to the current source locale string in the dictionary is mapped to the current node (104H). In this way, the current node becomes a string node, ending the node chain that has been created in following the process of part 104D for the characters of the current source locale string. Once part 104B has been performed for each source locale string, the tree corresponding to the dictionary is completely constructed.

Figure 6B:
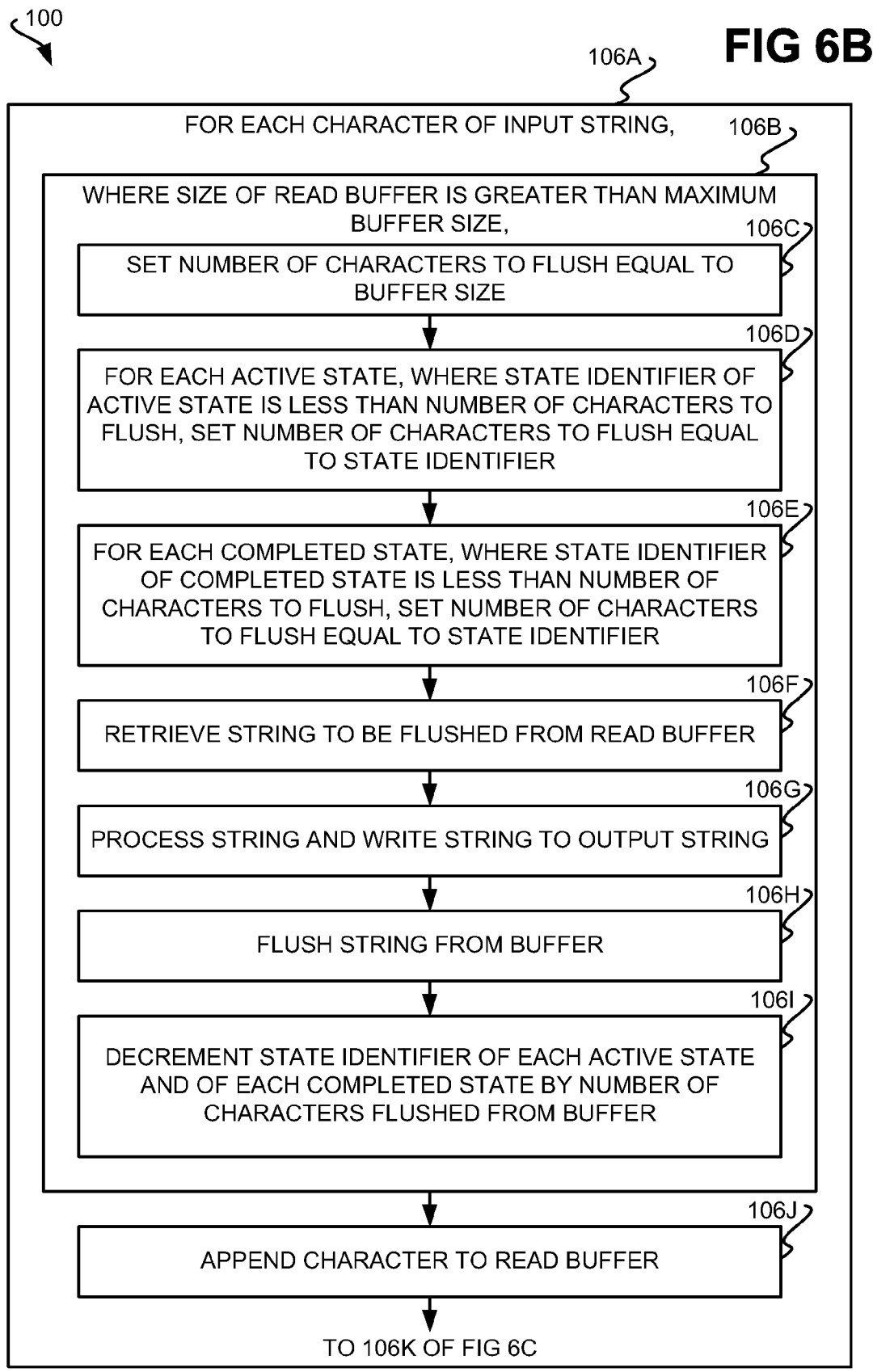

Referring next to FIG. 6B, processing an input string against the tree that has been constructed to generate the output string is started. It is noted that in general, characters of the input string are processed on a character-by-character basis and appending to a read buffer in a first-in, first-out (FIFO) manner. The description of processing an input string against the tree refers to active states and completed states as have been described in the previous section of the detailed description. Furthermore, there are inactive states, which are states that were previously active but that are no longer active, but that are also not completed states.

Each state also has a state identifier. The state identifier of a state is incremented for each node that is traversed within the tree, where the state identifier may at times be decremented. For instance, in FIG. 4, traversing the tree from the start node 404 to the node "F" results in incrementing of the corresponding state from zero to one. Each time a state advances to a child node of an existing (current) node, the state identifier for that state is incremented by one.

Still referring to FIG. 6B, the following is performed for each character of the source locale input string (106A), in order from the first character of the input string to the last character of the input string, where the source locale input string has a number of characters. If the size of the read buffer to which characters of the input string are spooled is greater than a predetermined maximum buffer size (106B), then the following is performed. (It is noted that the terms "read buffer" and "buffer" are used interchangeably herein.) First, the number of characters to flush from the buffer is initially set equal to the maximum buffer size (106C).

For each active state, if the state identifier of the active state in question is less than the number of characters to flush, then the number of characters to flush is reset to a number of characters equal to the state identifier of the active state in question (106D). Likewise, for each completed state, if the state identifier of the completed state in question is less than the number of characters to flush, then the number of characters to flush is reset to a number of characters equal to the state identifier of the completed state in question (106E). The string to be flushed, or deleted, from the read buffer is then retrieved (106F), starting from the first (oldest) character within the buffer, and proceeding to a number of characters within the number equal to the number of characters that are to be flushed.

This string is processed and is written to the target locale output string (106G). Processing the string includes any additional operations that may have to be performed on the string before being written out, as can be appreciated by those of ordinary skill within the art. The string is then flushed, or deleted, from the buffer (106H). The state identifier of each active state and the state identifier of each completed state is decremented by the number of characters that have been flushed from the read buffer (106I). The current character of the input string is then appended to the read buffer (106J), as a newest character of the buffer.

Referring next to FIG. 6C, the following continues to be performed for each character of the input string (106A). The active states are each processed based on the current character (106K), to result in a (first) list of new states. How the active states are each processed based on the current character to result in a (first) list of new states is described later in the detailed description, in relation to FIG. 6D. As has been noted, an active state represents a procession through the tree, such that the process encompasses a linked number of the nodes of the tree matching previous characters of the input string that have already been processed. The existing active states are cleared, and a new set of active states is set equal to the new states in the (first) list (106L).

Next, a new state representing the start node is created, and the new state is processed based on the current character (106M), to result in a (second) list of new states. The new state created is processed in the same manner in which each active state is processed in part 106K. The new seconds in the (second) list are then added to the active states (106N), and the active states are pruned. How the active states are pruned is described later in the detailed description, in relation to FIG. 6E.

After pruning, if no active state remains, then the completed states are processed (106P). This results in the translation of a grouping of characters within the source locale input string to the target locale. The manner by which the completed states are processed is described later in the detailed description, in relation to FIG. 6F. However, if after pruning one or more active states remain, then a number of what are referred to herein as candidate sets are determined and processed (106Q). The manner by which the candidate states are determined is described later in the detailed description, in relation to FIG. 6G. Furthermore, the manner by which the candidate states are processed is the same manner in which the completed states are processed in part 106P.

Once all the characters of the input string have been processed, any remaining active states are cleared in one embodiment (106R). A replace operation is then performed in relation to the completed states (106S). That is, the target locale string corresponding to each completed state is replaced within the input string for the corresponding source locale string of the node chain of this completed state, to complete generation of the output string. Any remaining characters within the read buffer are written, or copied, to the target locale output string (106T). Finally, the target locale output string is output (108), as has been described in relation to FIG. 1.

Figure 6D:
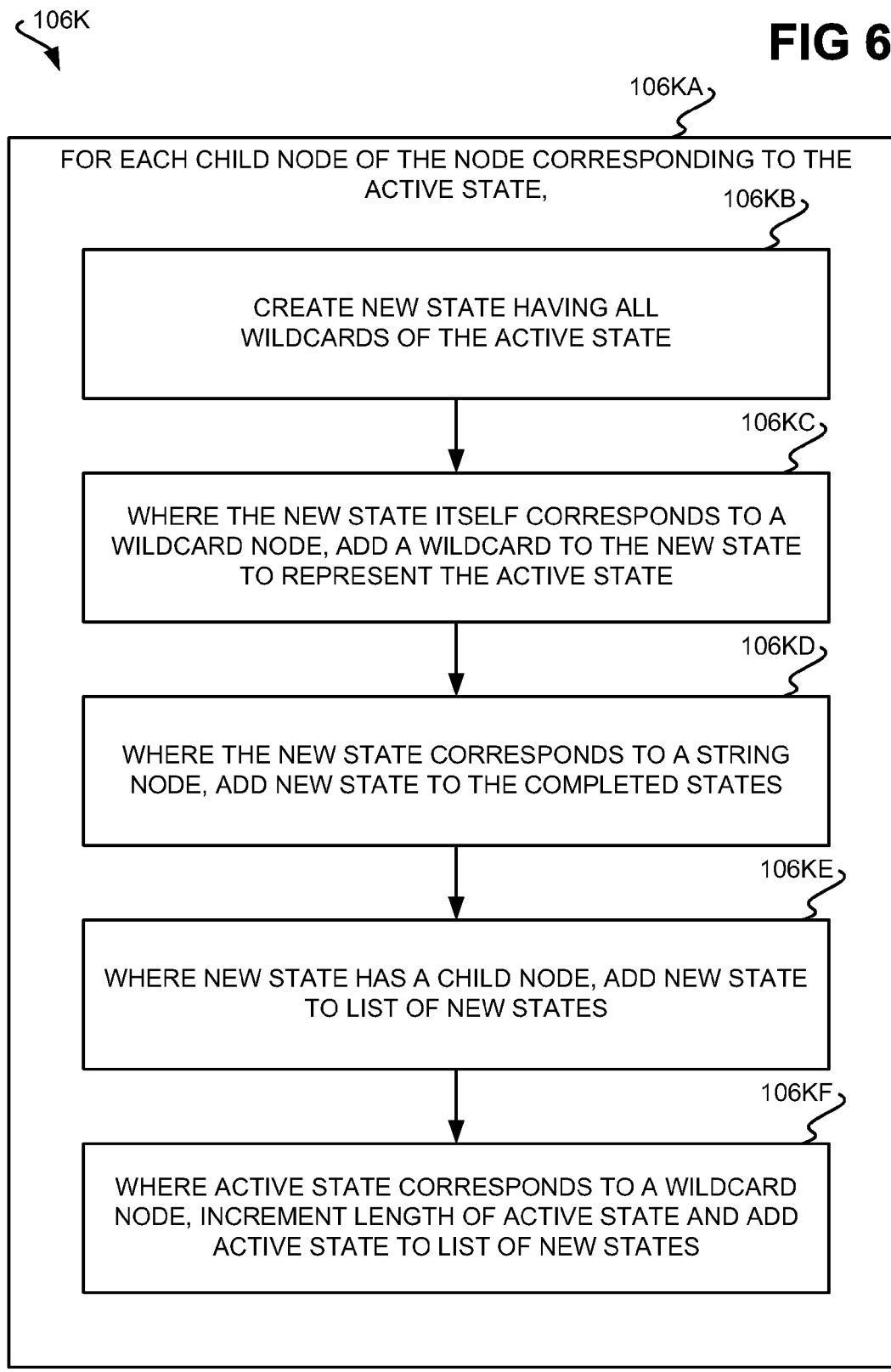

FIG. 6D shows how an active state may be processed in part 106K of FIG. 6C, according to an embodiment of the invention. The following is performed for each child node of the node within the tree that corresponds to the active state in question (106KA). First, if the active state has any wildcard characters (that is, if the active state has crossed any wildcard nodes), a new state having all the wildcard characters of the active state is created (106KB), where this new state has all the wildcard characters of the active state. Where the new state itself corresponds to a wildcard node within the tree, then a wildcard character is added to the new state to represent the active state (106KC).

Where the new state corresponds to a string node, then the new state is added to the completed states (106KD). Furthermore, where the new state has a child node, the new state is added to the list of new states (106KE). Finally, where the active state corresponds to a wildcard node, the length of the active state is incremented and the active state itself is added to the list of new states (106KF).

FIG. 6E shows how the active states may be pruned in part 106O of FIG. 6C, according to an embodiment of the invention. The following is performed where there is at least one non-active state (106OA). A non-active state is a state that was previously active, but that is no longer active because it no longer accurately matches the characters of the input string that are being processed from the read buffer. (It is noted that two lists are maintained: a completed states list and a non-active states list. Non-active states are completed states, but may overlap each other or the active states.) First, an initially empty list of wildcard states is created (106OB). A wildcard state is a state corresponding to a wildcard node within the tree.

For each active state, if the active state is a wildcard state, the state of each wildcard character within the active state is added to the list of wildcard states (106OC). By comparison, for each non-active state, if the non-active state is a wildcard state, the state of each wildcard character within the non-active state that is also present within the active state in question is removed from the active states where this wildcard state is also present within the list of wildcard states (106OD). That is, if a non-active state is a wildcard state, and the state of a wildcard character within the wildcard state is present both in the active lists and in the list of wildcard states, then the state of this wildcard character is removed from the list of wildcard states.

FIG. 6F shows how the completed states are processed in part 106P of FIG. 6C, according to an embodiment of the invention. The completed states are processed in increasing order of their state identifiers (106PA). Thus, the completed state having the lowest state identifier is first, and the completed state having the greatest state identifier is last. An index start counter is initially set to zero (106PB).

For each completed state, in the order in which the completed states have been sorted, the following is performed (106PC). A string is extracted from the read buffer (106PD). The string is extracted as a first character within the buffer to a character in the read buffer corresponding to the state identifier of the completed state in question. For instance, where the state identifier is five, then the first five characters are extracted from the read buffer.

The replacement string of the string node to which the completed state corresponds is retrieved (106PE). The replacement string is the target locale string associated with the string node of this completed state. Any wildcard characters within the replacement string are replaced with corresponding characters from the read buffer (106PF). The replacement string can be processed if needed, and then is written to the target locale output string (106PG). The index counter is then set equal to the state identifier of the completed state, plus the length of the completed state (i.e., the length of the replacement string) (106PH).

Once all the completed states have been processed, for each non-active state, if the state identifier of the non-active state is less than the index start counter, then the non-active state is removed from the set of non-active states (106PI). The completed states are also cleared (106PJ). Finally, the read buffer is flushed (106PK), from the first character of the read buffer to the character of the read buffer corresponding to the index start counter. For example, if the index start counter is five, then the first five characters of the read buffer are flushed, or deleted.

Figure 6G:
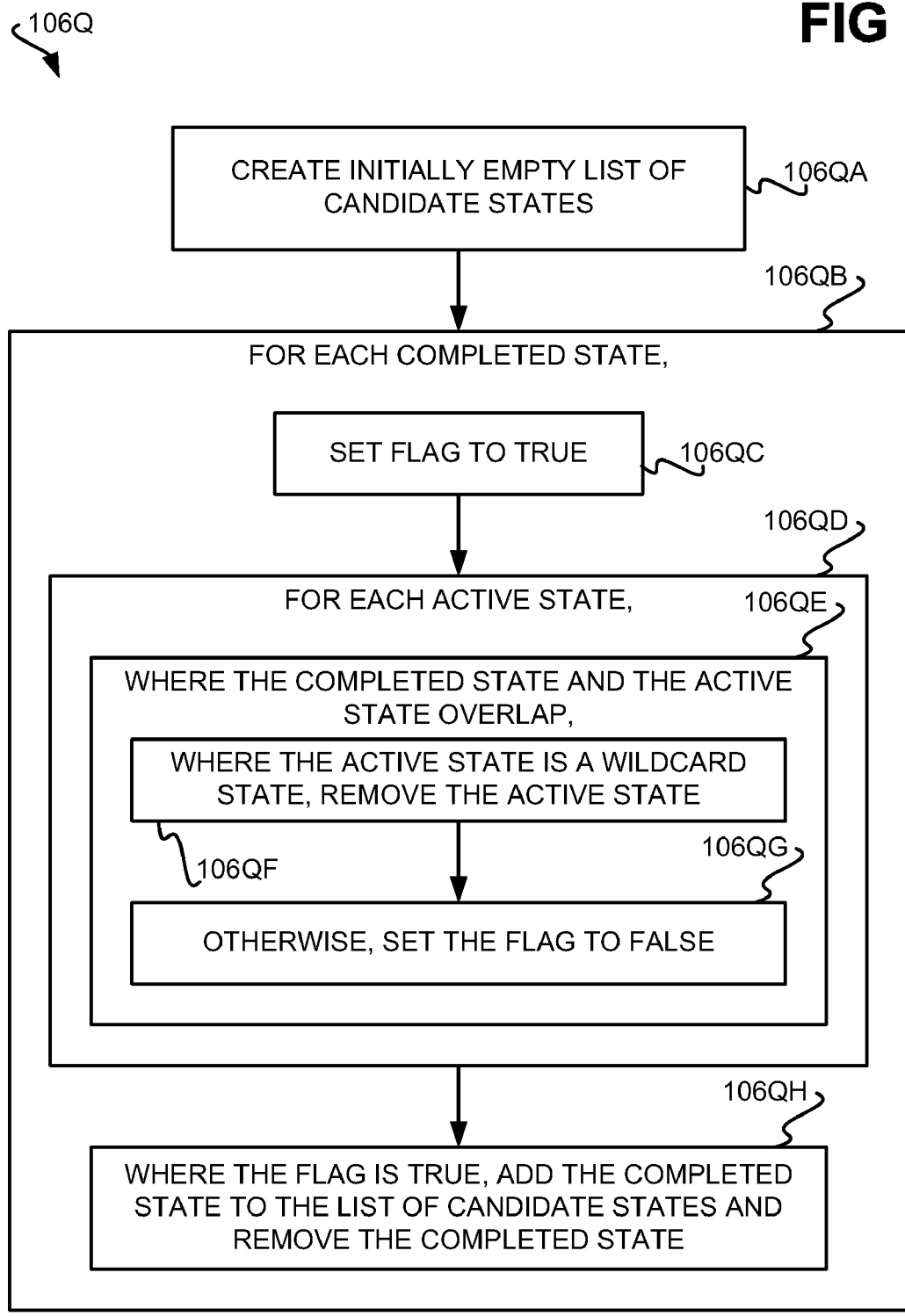

FIG. 6G shows how the candidate states are determined in part 106Q of FIG. 6C, according to an embodiment of the invention. An initially empty list of candidate states is created (106QA). The following is then performed for each completed state (106QB). A flag is initially set to true (106QC). Each active state is then processed as follows (106QD). If the completed state in question and the active state overlap (106QE)—i.e., the completed state and the active state share one or more nodes—then the following is performed.

If the active state is a wildcard state, it is removed from the set of active states (106QF). Otherwise, where the active state is not a wildcard state, the flag is set to false (106QG). Once all the active states have been processed for a given completed state in this manner, if the flag remains true, the completed state in question is added to the list of candidate states, and is removed from the set of completed states (106QH).

REPRESENTATIVE SYSTEM AND CONCLUSION

Figure 7:
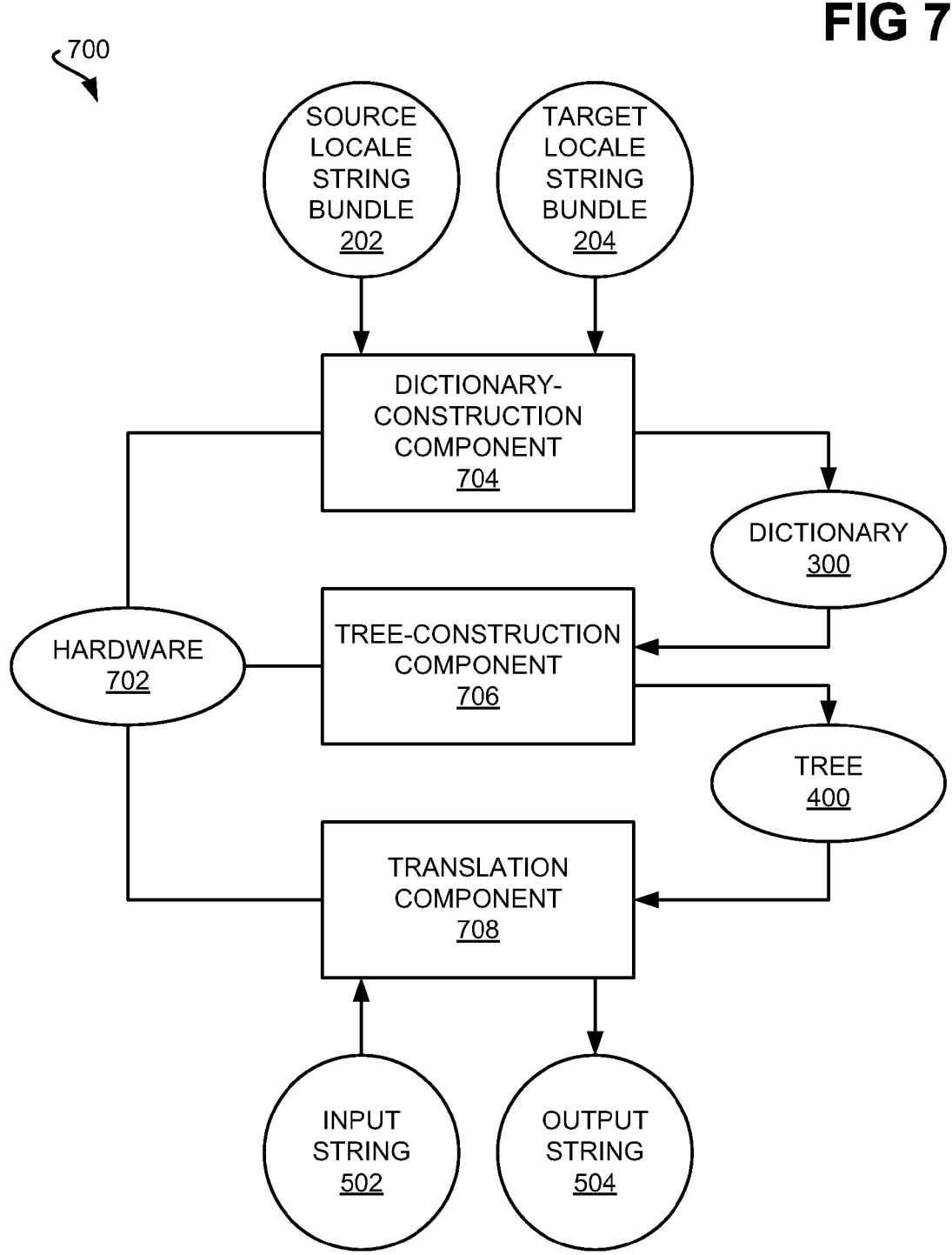
FIG. 7 is a block diagram of a system for translating an input string having a source locale to an output string having a target locale, according to an embodiment of the invention.

In conclusion, FIG. 7 shows a representative system 700, according to an embodiment of the invention. The system 700 includes hardware 702, such as processors, memory, storage devices, and other types of hardware. The system 700 further includes a dictionary-construction component 704, a tree-construction component 706, and a translation component 708. The components 704, 706, and 708 are implemented at least by the hardware 702. For instance, the components 704, 706, and 708 may be purely implemented in the hardware 702, or they may be software running on the hardware 702.

The dictionary construction component 704 generates the dictionary 300 from the source locale string bundle 202 and the target locale string bundle 204, as has been described. The tree-construction component 706 generates the tree 400 from the dictionary 300, as has been described. The translation component applies the source locale input string 502 against the tree 400 to generate a target locale output string 504 that is a translated version of the input string 502, in the target locale, as has been described.

It is further and finally noted that, although specific embodiments have been illustrated and described herein, it will be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

We claim:

1. A method to translate an input string having a source locale to an output string having a target locale comprising:
    constructing, by a processor of a computing device, a dictionary mapping source locale strings of the source locale to target locale strings of the target locale;
    constructing, by the processor, a tree from the dictionary, the tree having a plurality of nodes including a start node, one or more end nodes, and one or more string nodes, the nodes forming one or more node chains of the tree, the node chains corresponding to the source locale strings,
        each node chain linking a collection of the nodes from the start node to one of the string nodes, each node within the collection of the nodes being linked to another node within the collection of nodes,
        each node other than the start node having a parent node, each node other than the start node corresponding to a character of the source locale strings;
        each node other than the end nodes having one or more child nodes,
        each string node ending one of the node chains of the tree, each string node corresponding to a mapping within the dictionary of one of the source locale strings to one of the target locale strings;
    processing, by the processor, the input string against the tree to generate the output string, the input string having a plurality of characters, the characters processed on a character-by-character basis against the tree to match each sub-plurality of one or more sub-pluralities of the characters to one of the node chains within the tree to translate the sub-plurality of the characters from the source locale to the target locale; and,
    outputting, by the processor, the output string,
    wherein processing the input string against the tree comprises:
        for each character of the input string,
            appending the character to a read buffer;
            processing one or more active states based on the character,
                where each active state represents a procession through the tree such that the procession encompasses a linked number of the nodes of the tree matching previous characters of the input string that have already been processed,
                where processing the active states results in a first list of new states;
            clearing the active states;
            setting the new states within the first list as the active states;
            creating a new state representing the start node and processing new state based on the character in a same manner in which the active states are processed based on the character, where processing the new state results in a second list of new states;
            adding the new states within the second list to the active states;
            pruning the active states;
            where there are no active states after pruning, processing one or more completed states,
                where each completed state represents a procession through the tree corresponding to one of the node chains ending in one of the string nodes,
                where processing the completed states results in translation of one of the sub-pluralities of the characters of the input string from the source locale to the target locale within the output string;
            otherwise, where there are active states after pruning, determining one or more candidate states, where each candidate state represents a completed state;
                processing the candidate states in a same manner in which the completed states are processed;
        performing a replace operation in relation to the completed states; and,
        writing any remaining characters within the read buffer to the output string.

2. The method of claim 1, wherein at least one of the string nodes is an end node, and at least one of the string nodes is not an end node.

3. The method of claim 1, wherein at least one of the node chains shares one or more of the nodes with at least one other of the node chains.

4. The method of claim 1, wherein at least one of the source locale strings comprises a wildcard character, such that one of the nodes within the tree corresponds to the wildcard character and is a wildcard node within the tree.

5. The method of claim 4, wherein each node of the node chain to which the sub-plurality of the characters matches, other than the start node and other than the node of the node chain to which the sub-plurality of the characters matches that corresponds to the wildcard character, corresponds to a single character within the sub-plurality of the characters of the input string, and
    wherein the node of the node chain to which the sub-plurality of the characters matches that corresponds to the wildcard character corresponds to more than one character within the sub-plurality of the characters of the input string.

6. The method of claim 1, wherein constructing the dictionary comprises:
    reading a source locale file, the source locale file having the source locale strings identified by property names;
    reading a target locale file, the target locale file having the target locale strings identified by the property names; and,
    for each property name,
        creating a table entry for the property name, the table entry created within a table, the table entry mapping the source locale string identified by the property name to the target locale string identified by the property name.

7. The method of claim 6, wherein constructing the dictionary further comprises, for each property name, where source locale string has a plurality of consecutive wildcard characters, replacing the plurality of consecutive wildcard characters with a single wildcard character within the source locale string as stored in the table entry.

8. The method of claim 1, wherein constructing the tree from the dictionary comprises:
creating the start node of the tree;
for each source locale string within the dictionary,
setting a current node of the tree equal to the start node;
for each character of a plurality of characters of the source locale string,
where the current node has a child node corresponding to the character, setting the current node to the child node;
otherwise, where the current node does not have a child node corresponding to the character, creating a new child node of the current node and setting the current node to the new child node; and,
mapping the target locale string to which the source locale string corresponds to the current node.

9. The method of claim 8, wherein constructing the tree from the dictionary further comprises, where the character of the source locale string is a wildcard character, and where the current node is the start node or where the current node is a wildcard node, skipping the character.

10. The method of claim 1, wherein processing the input string against the tree further comprises, for each character of the input string,
where a size of the read buffer is greater than a maximum buffer size,
setting a number of characters to flush from the read buffer equal to the buffer size;
for each active state, where a state identifier of the active state is less than the number of characters to flush from the read buffer, setting the number of characters to flush from the read buffer equal to the state identifier of the active state;
for each completed state, where a state identifier of the completed state is less than the number of characters to flush from the read buffer, setting the number of characters to flush from the read buffer equal to the state identifier of the completed state;
retrieving a string to be flushed from the buffer, starting from a first character within the buffer, the string having a number of characters equal to the number of characters to flush from the read buffer;
writing the string to the output string;
flushing the string from the buffer; and,
decrementing the state identifier of each active state and the state identifier of each completed state by the number of characters flushed from the read buffer.

11. The method of claim 1, The method of claim 10, wherein processing the active states based on the character comprises, for each active state:
for each child node of the node within the tree corresponding to the active state,
creating a new state having all wildcards of the active state to the first list of new states;
where the new state corresponds to a wildcard node within the tree, adding a wildcard to the new state to represent the active state;
where the new state corresponds to a string node within the tree,
adding the new state to the completed states;
where the new state has a child node,
adding the new state to the first list of new states;
where the active state corresponds to a wildcard node within the tree,
incrementing a length of the active state and adding the active state to the first list of new states.

12. The method of claim 1, wherein pruning the active states comprises:
where there is at least one non-active state,
creating a list of wildcard states, the list of wildcard states being initially empty;
for each active state,
where the active state is a wildcard state having one or more wildcard characters, for each wildcard character within the active state, adding the state of the wildcard character to the list of wildcard states; and,
for each non-active state,
where the non-active state is a wildcard state having one or more wildcard characters, for each wildcard character within the active state, where the state of the wildcard character is present within the list of wildcard states, removing the state of the wildcard character from the active states.

13. The method of claim 1, wherein processing the completed states comprises:
sorting the completed states by increasing order of a state identifier, where each completed state has a state identifier;
setting an index start counter to zero;
for each completed state, in an order in which the completed states have been sorted,
extracting from the read buffer a string from a first character of the read buffer to a character of the read buffer corresponding to the state identifier of the completed state;
retrieving a replacement string from the string node to which the completed state corresponds;
replacing any wildcard characters within the replacement string with corresponding characters from the read buffer;
writing the replacement string to the output string;
setting the index start counter to the state identifier of the completed state plus a length of the completed state;
for each non-active state of one or more non-active states,
where a state identifier of the non-active state is less than the index start counter, removing the non-active state from the non-active states;
clearing the completed states; and,
flushing the read buffer from the first character of the read buffer to a character of the read buffer corresponding to the index start counter.

14. The method of claim 1, wherein determining the candidate states comprises:
creating a list of candidate states, the list of candidate states being initially empty;
for each completed state,
setting a flag to true;
for each active state,
where the completed state and the active state overlap,
where the active state is a wildcard state, removing the active state from the active states;
otherwise, where the active state is not a wildcard state, setting the flag to false; and,
where the flag is true,
adding the completed state to the list of candidate states and removing the completed state from the completed states.

15. The method of claim 1, wherein outputting the output string comprises one or more of:
storing the output string on a computer-readable medium;
displaying the output string on a display device for viewing by a user;
printing the output string using a printing device for viewing by the user; and,
communicating the output string over a network.

16. The method of claim 1, wherein the input string is part of an error log file generated by an application computer program having the source locale.

17. A system for translating an input string having a source locale to an output string having a target locale, the system comprising:
hardware;
a dictionary-construction component implemented at least by the hardware, the dictionary-construction component to construct a dictionary by mapping source locale strings of the source locale to target locale strings of the target locale;
a tree-construction component implemented at least by the hardware, the tree-construction component to construct a tree from the dictionary, the tree having a plurality of nodes including a start node, one or more end nodes, and one or more string nodes, the nodes forming one or more node chains of the tree, the node chains corresponding to the source locale strings,
each node chain linking a collection of the nodes from the start node to one of the string nodes, each node within the collection of the nodes being linked to another node within the collection of nodes,
each node other than the start node having a parent node, each node other than the start node corresponding to a character of the source locale strings;
each node other than the end nodes having one or more child nodes,
each string node ending one of the node chains of the tree, each string node corresponding to a mapping within the dictionary of one of the source locale strings to one of the target locale strings; and,
a translation component implemented at least by the hardware to process the input string against the tree to generate the output string, the input string having a plurality of characters, the translation component to process the characters on a character-by-character basis against the tree to match each sub-plurality of one or more sub-pluralities of the characters to one of the node chains within the tree to translate the sub-plurality of the characters from the source locale to the target locale,
wherein the translation component is to process the input string against the tree by:
for each character of the input string,
appending the character to a read buffer;
processing one or more active states based on the character,
where each active state represents a procession through the tree such that the procession encompasses a linked number of the nodes of the tree matching previous characters of the input string that have already been processed,
where processing the active states results in a first list of new states;
clearing the active states;
setting the new states within the first list as the active states;
creating a new state representing the start node and processing the new state based on the character in a same manner in which the active states are processed based on the character, where processing the new state results in a second list of new states;
adding the new states within the second list to the active states;
pruning the active states;
where there are no active states after pruning, processing one or more completed states,
where each completed state represents a procession through the tree corresponding to one of the node chains ending in one of the string nodes,
where processing the completed states results in translation of one of the sub-pluralities of the characters of the input string from the source locale to the target locale within the output string;
otherwise, where there are active states after pruning, determining one or more candidate states, where each candidate state represents a completed state;
processing the candidate states in a same manner in which the completed states are processed;
performing a replace operation in relation to the completed states; and,
writing any remaining characters within the read buffer to the output string.

18. The system of claim 17, wherein the input string is part of an error log file generated by an application computer program having the source locale.

19. A computer-readable medium having one or more computer programs stored thereon for execution by one or more processors to perform a method to translate an input string having a source locale to an output string having a target locale comprising:
constructing a dictionary mapping source locale strings of the source locale to target locale strings of the target locale;
constructing a tree from the dictionary, the tree having a plurality of nodes including a start node, one or more end nodes, and one or more string nodes, the nodes forming one or more node chains of the tree, the node chains corresponding to the source locale strings,
each node chain linking a collection of the nodes from the start node to one of the string nodes, each node within the collection of the nodes being linked to another node within the collection of nodes,
each node other than the start node having a parent node, each node other than the start node corresponding to a character of the source locale strings;
each node other than the end nodes having one or more child nodes,
each string node ending one of the node chains of the tree, each string node corresponding to a mapping within the dictionary of one of the source locale strings to one of the target locale strings; and,
processing the input string against the tree to generate the output string, the input string having a plurality of characters, the characters processed on a character-by-character basis against the tree to match each sub-plurality of one or more sub-pluralities of the characters to one of the node chains within the tree to translate the sub-plurality of the characters from the source locale to the target locale,
wherein processing the input string against the tree comprises:
for each character of the input string,
appending the character to a read buffer;

processing one or more active states based on the character,
- where each active state represents a procession through the tree such that the procession encompasses a linked number of the nodes of the tree matching previous characters of the input string that have already been processed,
- where processing the active states results in a first list of new states;

clearing the active states;

setting the new states within the first list as the active states;

creating a new state representing the start node and processing the new state based on the character in a same manner in which the active states are processed based on the character, where processing the new state results in a second list of new states;

adding the new states within the second list to the active states;

pruning the active states;

where there are no active states after pruning, processing one or more completed states,
- where each completed state represents a procession through the tree corresponding to one of the node chains ending in one of the string nodes,
- where processing the completed states results in translation of one of the sub-pluralities of the characters of the input string from the source locale to the target locale within the output string;

otherwise, where there are active states after pruning,
- determining one or more candidate states, where each candidate state represents a completed state;
- processing the candidate states in a same manner in which the completed states are processed;

performing a replace operation in relation to the completed states; and, writing any remaining characters within the read buffer to the output string.

* * * * *